United States Patent
Lu et al.

(10) Patent No.: US 10,638,192 B2
(45) Date of Patent: Apr. 28, 2020

(54) LIVE STREAMING QUICK START METHOD AND SYSTEM

(71) Applicant: WANGSU SCIENCE & TECHNOLOGY CO., LTD., Shanghai (CN)

(72) Inventors: Meihui Lu, Shanghai (CN); Hong Chen, Shanghai (CN); Shibiao Lv, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 162 days.

(21) Appl. No.: 15/741,936

(22) PCT Filed: Jul. 13, 2017

(86) PCT No.: PCT/CN2017/092824
§ 371 (c)(1),
(2) Date: Jan. 4, 2018

(87) PCT Pub. No.: WO2018/232799
PCT Pub. Date: Dec. 27, 2018

(65) Prior Publication Data
US 2018/0376195 A1    Dec. 27, 2018

(30) Foreign Application Priority Data
Jun. 19, 2017   (CN) .......................... 2017 1 0464840

(51) Int. Cl.
*G06F 15/16* (2006.01)
*H04N 21/4402* (2011.01)
(Continued)

(52) U.S. Cl.
CPC ..... *H04N 21/4402* (2013.01); *H04N 21/2187* (2013.01); *H04N 21/8456* (2013.01); *H04N 21/8547* (2013.01); *H04N 21/440281* (2013.01)

(58) Field of Classification Search
CPC .............................................. H04N 21/440281
See application file for complete search history.

(56) References Cited

U.S. PATENT DOCUMENTS 6,658,199 B1 * 12/2003 Hallberg .............. H04N 9/8042
386/346
7,194,548 B1 * 3/2007 Matsumi ............... G06F 3/0613
709/231
(Continued)

FOREIGN PATENT DOCUMENTS

| CN | 101193273 A | 6/2008 | |
|---|---|---|---|
| WO | 2017092336 A1 | 6/2017 | |
| WO | WO-2017092336 A1 * | 6/2017 | ............. H04N 21/61 |

OTHER PUBLICATIONS

The European Patent Office (EPO) The Extended European Search Report for 17849862.2 (PCT/CN2017/092824) dated May 17, 2019 31 Pages.

*Primary Examiner* — Hieu T Hoang
(74) *Attorney, Agent, or Firm* — Anova Law Group, PLLC

(57) ABSTRACT

The present disclosure relates to a live streaming quick start method and system, which belong to streaming media technology. The method comprises: slicing, by a server, an audio-video stream into slice files, and assigning a sequence number to each generated slice file according to timestamps of the audio-video stream; recording, by the server, key frame information of the audio-video stream; determining, by the server, an initial slice file sequence number in response to a live streaming request sent by a player client;

(Continued)

based on the initial slice file sequence number and the recorded audio-video stream key frame information, transmitting, by the server, a start-streaming response file and the initial slice file sequence number to the player client; and resetting, by the player client, timestamps for the start-streaming response file based on a key frame closest to the initial slice file, and decoding and playing the start-streaming response file.

20 Claims, 4 Drawing Sheets

(51) Int. Cl.
    *H04N 21/8547* (2011.01)
    *H04N 21/845* (2011.01)
    *H04N 21/2187* (2011.01)

(56) References Cited

U.S. PATENT DOCUMENTS

| | | | | |
|---|---|---|---|---|
| 7,656,890 B2* | 2/2010 | Chapman | ............ | H04L 12/2801 370/431 |
| 7,940,805 B2* | 5/2011 | Ichikawa | ............ | H04L 43/106 370/503 |
| 8,280,863 B2* | 10/2012 | Pantos | ............ | H04N 7/17318 707/693 |
| 8,301,725 B2* | 10/2012 | Biderman | ............ | H04N 7/17318 709/217 |
| 8,532,171 B1* | 9/2013 | Narayanan | ............ | H04N 21/8451 375/240.01 |
| 2003/0206596 A1* | 11/2003 | Carver | ............ | H04N 21/23424 375/240.26 |
| 2004/0047614 A1* | 3/2004 | Green | ............ | H04N 5/783 386/217 |
| 2004/0205214 A1* | 10/2004 | Bång | ............ | H04N 21/4341 709/231 |
| 2005/0105896 A1* | 5/2005 | Kochale | ............ | H04N 9/888 386/268 |
| 2006/0023706 A1* | 2/2006 | Varma | ............ | G10L 19/167 370/389 |
| 2006/0050697 A1* | 3/2006 | Li | ............ | H04L 29/06027 370/389 |
| 2006/0117352 A1* | 6/2006 | Yamagata | ............ | G11B 27/105 725/50 |
| 2006/0143669 A1* | 6/2006 | Cohen | ............ | H04N 7/173 725/90 |
| 2007/0053428 A1* | 3/2007 | Saleem | ............ | H04N 19/115 375/240 |
| 2007/0122123 A1* | 5/2007 | Nakagawa | ............ | H04N 21/231 386/231 |
| 2007/0208872 A1* | 9/2007 | Cheng | ............ | H04N 21/4334 709/231 |
| 2008/0172708 A1* | 7/2008 | Perry | ............ | H04W 72/005 725/110 |
| 2008/0222300 A1* | 9/2008 | Bouazizi | ............ | H04H 20/28 709/231 |
| 2008/0267222 A1* | 10/2008 | Leung | ............ | H04N 21/23424 370/503 |
| 2009/0133085 A1* | 5/2009 | Soo | ............ | H04H 60/59 725/115 |
| 2009/0217318 A1* | 8/2009 | VerSteeg | ............ | G06Q 30/02 725/32 |
| 2009/0257435 A1* | 10/2009 | Karlsson | ............ | H04N 7/17318 370/394 |
| 2009/0260030 A1* | 10/2009 | Karlsson | ............ | G06Q 30/02 725/32 |
| 2009/0313676 A1* | 12/2009 | Takeshima | ............ | H04L 29/06027 725/119 |
| 2010/0008420 A1* | 1/2010 | Lin | ............ | G11B 27/034 375/240.15 |
| 2010/0189131 A1* | 7/2010 | Branam | ............ | H04N 21/23424 370/474 |
| 2010/0306373 A1* | 12/2010 | Wormley | ............ | H04L 67/1029 709/224 |
| 2012/0147973 A1* | 6/2012 | Wu | ............ | H04N 19/188 375/240.25 |
| 2013/0173819 A1* | 7/2013 | Lee | ............ | H04N 21/23418 709/231 |
| 2014/0064698 A1* | 3/2014 | Lin | ............ | H04N 9/79 386/241 |
| 2014/0189736 A1* | 7/2014 | Kummer | ............ | H04N 21/4263 725/39 |
| 2014/0328578 A1* | 11/2014 | Shafron | ............ | H04N 21/63 386/328 |
| 2016/0088051 A1* | 3/2016 | Chen | ............ | H04N 19/102 375/240.02 |
| 2017/0353518 A1* | 12/2017 | McLeod | ............ | H04L 65/4084 |
| 2017/0359601 A1* | 12/2017 | Sievers | ............ | H04N 9/8205 |

* cited by examiner

LIVE STREAMING QUICK START METHOD AND SYSTEM

CROSS-REFERENCE TO RELATED APPLICATIONS

This application is a national phase entry under 35 U.S.C § 371 of International Application No. PCT/CN2017/092824 filed on Jul. 13, 2017, which claims priority of Chinese Patent Application No. 201710464840.7, filed with the State Intellectual Property Office of P. R. China on Jun. 19, 2017, the entire contents of all of which are incorporated herein by reference.

FIELD OF THE DISCLOSURE

The present disclosure generally relates to the streaming media technology and, more particularly, relates to a live streaming quick start method and system.

BACKGROUND

In live streaming, the speed for displaying the first image on the screen may directly affect user experience. Taking on-demand streaming as an example, on-demand streaming user always cuts in from 0 second. In any on-demand streaming media file, the first audio-video frame at 0 second must be a key frame. Thus, for on-demand services, regardless of network transmission and decoding factors, the speed for displaying the first image on the screen may often be treated as real-time display.

However, for live streaming, a live media file may often be a streaming media file. A live streaming user may access the streaming media file at any random time. Thus, a first audio-video frame when the user cuts in may be an intra-coding frame (I-frame) also known as key frame, an inter-frame prediction coding frame (P-frame), or a bidirectional prediction coding frame (B-frame). When a player starts to play, the player needs a key frame to play properly. Thus, the following problems may exist.

1) When the player starts to play, very likely a dark screen is displayed. Moreover, when group of pictures (GOP) for the live streaming media file is large, the gap between the first audio-video frame that the player receives and the next key frame is relatively long, and hence the user may have to wait for a long time to be able to see the first image.

2) When the server transmits data starting from the last key frame, extra delay to the live streaming may be introduced. Thus, user experience may be degraded.

BRIEF SUMMARY OF THE DISCLOSURE

To solve issues in the existing technology, the present disclosure provides a live streaming quick start method and a live streaming quick start system. The technical solutions include the followings.

One aspect of the present disclosure provides a live streaming quick start method, comprising:
slicing, by a server, an audio-video stream into slice files, and assigning a sequence number to each generated slice file according to timestamps of the audio-video stream;
recording, by the server, key frame information of the audio-video stream;
determining, by the server, an initial slice file sequence number in response to a live streaming request sent by a player client;
based on the initial slice file sequence number and the recorded audio-video stream key frame information, transmitting, by the server, a start-streaming response file and the initial slice file sequence number to the player client; and
resetting, by the player client, timestamps for the start-streaming response file based on a key frame closest to the initial slice file, and decoding and playing the start-streaming response file with the timestamps reset.

Further, based on the initial slice file sequence number and the recorded audio-video stream key frame information, transmitting, by the server, a start-streaming response file and the initial slice file sequence number to the player client includes:
determining, by the server, a key frame slice file that has a sequence number closest to the initial slice file sequence number, where the key frame slice file is a slice file that contains a key frame and has a sequence number smaller than or equal to the initial slice file sequence number, and at the same time, the difference between the sequence number of the key frame slice file and the initial slice file sequence number is the minimum;
when the sequence number of the key frame slice file is smaller than the sequence number of the initial slice file, transmitting the start-streaming response file and the initial slice file sequence number by the server to the player client, where the start-streaming response file includes the key frame slice file, intermediate slice files having the sequence numbers between the sequence number of the key frame slice and the sequence number of the initial slice file, and the initial slice file; and
when the sequence number of the key frame slice file is equal to the sequence number of the initial slice file, transmitting the start-streaming response file and the initial slice file sequence number by the server to the player client, where the start-streaming response file includes the initial slice file, and the initial slice file is the key frame slice file.

Further, when the sequence number of the key frame slice file is smaller than the sequence number of the initial slice file, resetting, by the player client, the timestamps for the start-streaming response file includes:
discarding, by the player client, the audio-video frames preceding the key frame in the key frame slice file, and resetting the timestamps of the key frame and the audio-video frames succeeding the key frame in the key frame slice file to an initial timestamp;
resetting, by the player client, the timestamps for the audio-video frames in the intermediate slice files to the initial timestamp; and
assuming the original timestamp for the first frame in the initial slice file is a reference value, resetting, by the player client, the timestamp for every frame in the initial slice file and the succeeding slice file to an adjusted timestamp, where the adjusted timestamp is the original timestamp for the corresponding audio-video frame minus the reference value and plus the initial timestamp.

Further, when the sequence number of the key frame slice file is equal to the sequence number of the initial slice file, resetting, by the player client, the timestamps for the start-streaming response file includes:
discarding, by the player client, the audio-video frames preceding the key frame in the key frame slice file, and resetting the timestamp for the key frame to an initial timestamp; and
assuming the original timestamp for the key frame is a reference value, resetting, by the player client, the timestamp for every audio-video frame succeeding the key frame to an adjusted timestamp, where the adjusted timestamp is the original timestamp for the corresponding audio-video frame minus the reference value and plus the initial timestamp.

Further, recording, by the server, key frame information in the audio-video stream includes:

based on the audio-video stream slice files and the corresponding sequence numbers, generating, by the server, a numbered list of key frame slice files.

Further, the slicing is physical slicing, and slicing, by the server, an audio-video stream into slices, and assigning a sequence number to each generated slice file according to timestamps of the audio-video stream further includes:

slicing, by the server, the audio-video stream according to a preset time interval to generate slice files; and assigning, by the server, natural numbers as the sequence numbers of the generated slice files according to the timestamps.

Further, resetting, by the player client, the timestamps for the start-streaming response file further includes:

after receiving, by the player client, the start-streaming response file and resetting the timestamps, continuing to request for the slice files succeeding the start-streaming response file from the server in the ascending order of the physical slice sequence numbers, resetting the timestamps, and decoding for playing.

Further, the slicing is logical slicing, and slicing by the server, an audio-video stream into slices, and assigning a sequence number to each generated slice file according to timestamps of the audio-video stream, further includes:

inserting, by the server, a header byte including a slice sequence number in the audio-video stream file according to a preset time interval; and assigning, by the server, natural numbers as the sequence numbers of the generated slice files according to the timestamps.

Further, resetting, by the player client, the timestamps for the start-streaming response file further includes:

after receiving, by the player client, the start-streaming response file and resetting the timestamps, continuing, by the server, to automatically transmit logic slices succeeding the start-streaming response file in the ascending order of the slice file sequence numbers; and resetting, by the player client, the timestamps, and decoding for playing.

Further, the live streaming request sent by the player client includes a delay parameter; and determining, by the server, an initial slice file sequence number in response to the live streaming request sent by the player client further includes:

calculating, by the server, an initial slice file sequence number based on the delay parameter in the live streaming request and the latest slice sequence number of the audio-video stream.

Another aspect of the present disclosure provides a live streaming quick start system, comprising:

a server including a slicing module and a transmitting module; and a player client including a timestamp resetting module and a decoding and playing module, wherein:

the slicing module is configured to slice an audio-video stream into slice files, assign a sequence number to each generated slice file according to timestamps of the audio-video stream, record key frame information of the audio-video stream, determine an initial slice file sequence number in response to a live streaming request sent by the player client;

the transmitting module is configured to transmit a start-streaming response file and the initial slice file sequence number to the player client based on the initial slice file sequence number and the recorded audio-video stream key frame information;

the timestamp resetting module is configured to reset timestamps for the start-streaming response file based on a key frame closest to the initial slice file; and the decoding and playing module is configured to decode and play the start-streaming response file having the timestamps reset.

Further, the transmitting module is further configured to:

determine a key frame slice file that has a sequence number closest to the initial slice file sequence number, wherein the key frame slice file is a slice file that contains a key frame and has a sequence number smaller than or equal to the sequence number of the initial slice file, and at the same time, the difference between the sequence number of the key frame slice file and the sequence number of the initial slice file is the minimum;

when the sequence number of the key frame slice file is smaller than the sequence number of the initial slice file, transmit the start-streaming response file and the initial slice file sequence number to the player client, wherein the start-streaming response file includes the key frame slice file, intermediate slice files having the sequence numbers between the sequence number of the key frame slice and the sequence number of the initial slice file, and the initial slice file; and when the sequence number of the key frame slice file is equal to the sequence number of the initial slice file, transmit the start-streaming response file and the initial slice file sequence number to the player client, wherein the start-streaming response file includes the initial slice file, and the initial slice file is the key frame slice file.

Further, when the sequence number of the key frame slice file is smaller than the sequence number of the initial slice file, the timestamp resetting module is further configured to:

discard the audio-video frames preceding the key frame in the key frame slice file, and reset the timestamps of the audio-video frames of the key frame and the succeeding key frame in the key frame slice file to an initial timestamp;

reset the timestamps for the audio-video frames in the intermediate slice files to the initial timestamp; and assuming the original timestamp for the first frame in the initial slice file is a reference value, reset the timestamp for every frame in the initial slice file and the succeeding slice file to an adjusted timestamp, wherein the adjusted timestamp is the original timestamp for the corresponding audio-video frame minus the reference value and plus the initial timestamp.

Further, when the sequence number of the key frame slice file is equal to the sequence number of the initial slice file, the timestamp resetting module is further configured to:

discard the audio-video frames preceding the key frame in the key frame slice file, and reset the timestamp for the key frame to an initial timestamp; and assuming the original timestamp for the first frame in the initial slice file is a reference value, reset the timestamp for every audio-video frame succeeding the key frame to an adjusted timestamp, wherein the adjusted timestamp is the original timestamp for the corresponding audio-video frame minus the reference value and plus the initial timestamp.

Further, the slicing module is further configured to generate a list of key frame slice file sequence numbers based on the audio-video stream slice files and the corresponding sequence numbers.

Further, when the slices are physically sliced, the slicing module is further configured to:

slice the audio-video stream according to a preset time interval and generate slice files accordingly; and assign natural numbers as the sequence numbers of the generated slice files according to the timestamps.

Further, the player client further includes a request module configured to continue to request for the slice files succeeding the start-streaming response file from the server in the ascending order of the physical slice sequence numbers.

Further, when the slices are logically sliced, the slicing module is further configured to:

insert a header byte including a slice sequence number in the audio-video stream file according to a preset time interval; and assign natural numbers as the sequence numbers of the generated slice files according to the timestamps.

Further, the transmitting module is further configured to continue to automatically transmit the logic slices succeeding the start-streaming response file in the ascending order of the slice sequence numbers.

Further, the live streaming request sent by the player client includes a delay parameter; and the transmitting module is further configured to calculate an initial slice file sequence number based on the delay parameter in the live streaming request and the latest slice sequence number of the audio-video stream.

The technical solution provided by the embodiments of the present disclosure brings the following beneficial effect.

The timestamps of the start-streaming response file may be reset according to the sequence number of the key frame closest to the initial slice file. The key frame closest to the initial slice and the initial slice file may be combined to achieve the quick start effect. At the same time, the timestamps for all the audio-video frames between the key frame and the initial slice file may be reset to the initial timestamp, and may be rapidly skipped. Thus, the effect of not affecting the live streaming delay may be achieved.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts.

DETAILED DESCRIPTION

The objectives, features, and advantages of the present disclosure will become clearer from the following description of the embodiments of the present disclosure when taken in conjunction with the accompanying drawings.

Embodiment 1

Figure 1:
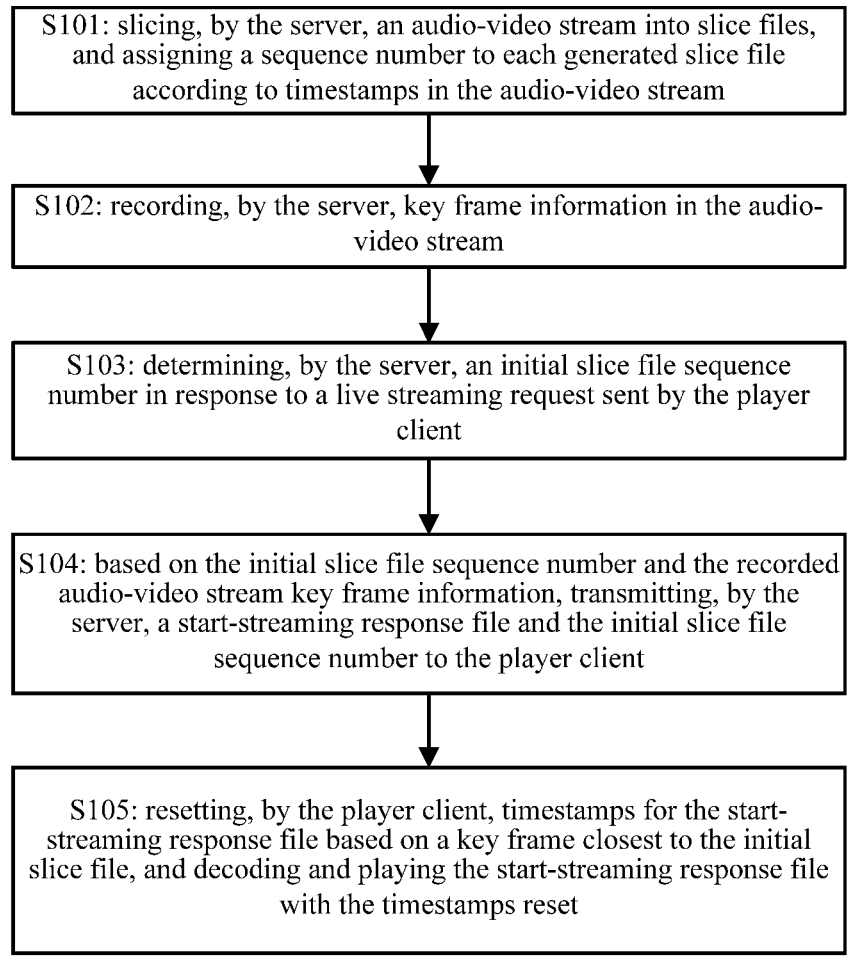
FIG. 1 illustrates a flow chart of an exemplary live streaming quick start method according to Embodiment 1 of the present disclosure.

The present disclosure provides a live streaming quick start method. Referring to FIG. 1, the method may include the following steps.

Step S101: slicing, by the server, an audio-video stream into slice files, and assigning a sequence number to each generated slice file according to timestamps in the audio-video stream.

Specifically, the server may be a server that provides a live streaming service, or an intermediate server such as a node server in a content delivery network (CDN). The player client may be a player having live streaming function, such as Youku video player, Tencent video player, and other local players, or a webpage player. The audio-video stream may be the audio-video data that are transmitted from live stage to the server through network transmission.

In the embodiment, the server may physically slice the audio-video stream or may logically slice the audio-video stream.

In the embodiment, when the slices are sliced physically, the server may slice the audio-video stream according to a preset time interval and generate slice files accordingly.

Specifically, the preset time interval may be configured according to actual requirement. For example, the preset time interval may be 1 second or 2 seconds. When the preset time interval is 1 second, the server may slice the audio-video stream according to the 1 second time interval, and may generate a plurality of slice files having a 1-second length in time.

The server may assign a natural number as the sequence number to each slice file according to timestamps.

Specifically, assigning sequence numbers to the slice files may be intended to distinguish the order of the slice files, and may sequentially process the slice files in an ascending order. Because each slice file may include a large amount of audio-video frames, each audio-video frame may include a timestamp. In a single slice file, the audio-video frames may be arranged according to the order of the timestamps. Thus, based on the timestamp of the first audio-video frame in each slice file, the server may determine the sequential order of the each slice file and assign sequence numbers based on the sequential order. The sequence numbers may be natural numbers assigned based on the timestamps. For example, the slice file that has the smallest timestamp may be assigned with the sequence number 1, the slice file that has the second smallest timestamp may be assigned with the sequence number 2, and the slice file that has a larger timestamp may be assigned with a larger sequence number. The starting sequence number may also be a different natural number, e.g., 5.

It should be noted that other methods may also be used to assign sequence numbers. For example, an alphanumerical format A1, A2, A3 . . . A1 may correspond to the slice file having the smallest timestamp, A2 may correspond to the slice file having the second smallest timestamp, and subsequent sequence numbers may correspond to the slice files having the ascending timestamps. In other words, as long as a sequence number format contains a sequential order, the sequence number format may be used to assign sequence numbers to the slice files.

In the embodiment, when the slices are sliced logically, the server may insert a header byte containing a slice sequence number into the audio-video stream file according to a preset time interval. The slice sequence numbers may be natural numbers assigned according to the timestamps.

Specifically, similar to the physical slicing method, in the logical slicing method, natural numbers may be assigned as sequence numbers to the slice files in the ascending order of timestamps, and the sequence numbers may be inserted to the header byte in the slice files.

Step S102: recording, by the server, key frame information in the audio-video stream.

In the embodiment, the server may generate a sequence number list for the slice files that contain a key frame based on the audio-video stream slice files and the corresponding sequence numbers.

Specifically, the server may record the sequence numbers for the slice files that contain a key frame, and may generate the sequence number list for the slice files that contain a key frame according to a certain rule, e.g., in the ascending order of the sequence numbers. The sequence number list may be the data used later to determine the slice files that contain a key frame.

Step S103: determining, by the server, an initial slice file sequence number in response to a live streaming request sent by the player client.

In the embodiment, the live streaming request transmitted by the player client may include a delay parameter. Based on the delay parameter in the live streaming request and the sequence number of the latest slice of the audio-video stream, the server may calculate the initial slice file sequence number.

Specifically, the initial slice file may be the slice file corresponding to the timestamp when the player client starts live streaming. The latest slice may be the latest slice file generated by the server and having a largest timestamp. The delay parameter may be a delay configured for the player client for the live streaming. For example, the delay parameter may be 3 seconds. The player client may play from the timestamp that includes 3-second delay from the latest audio-video stream. In other words, the server may transmit the audio-video stream to the player client from the position that is 3 seconds prior to the latest audio-video stream timestamp. Any prior audio-video stream data may not be transmitted to the client.

For example, when the slice time interval is set to 1 second, the delay parameter is set to 5 seconds, and the latest slice sequence number is 20, the server may calculate and obtain that the delay parameter is equal to 5 time intervals. The initial slice file sequence number may be 5 sequence numbers prior to the latest slice sequence number, that is, the initial slice file sequence number may be 15.

Step S104: based on the initial slice file sequence number and the recorded audio-video stream key frame information, transmitting, by the server, a start-streaming response file and the initial slice file sequence number to the player client.

Figure 2:
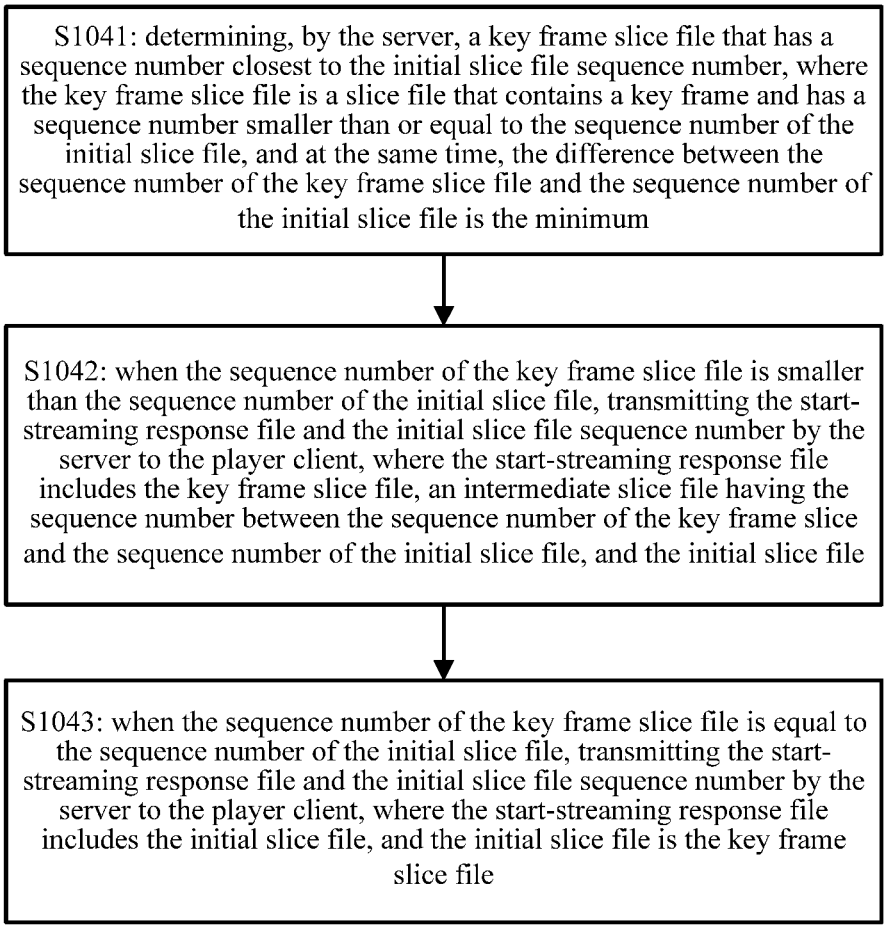
FIG. 2 illustrates a flow chart of exemplary detailed sub-steps for the step S104 according to Embodiment 1 of the present disclosure.

Referring to FIG. 2, in the embodiment, the step S104 may include three sub-steps S1041-S1043.

Step S1041: determining, by the server, a key frame slice file that has a sequence number closest to the initial slice file sequence number, where the key frame slice file is a slice file that contains a key frame and has a sequence number smaller than or equal to the sequence number of the initial slice file, and at the same time, the difference between the sequence number of the key frame slice file and the sequence number of the initial slice file is the minimum.

Specifically, the initial slice file may not contain a key frame. When the initial slice file does not contain a key frame, the player client may not be able to play the initial slice file, and the black screen may appear until a key frame slice file is received. Thus, the server may need to determine the key frame slice file that has a sequence number closest to the sequence number of the initial slice file, and may transmit the audio-video stream to the player client starting from the key frame slice file sequence number.

Because the sequence number are natural numbers in the ascending order, and the initial slice file sequence number has been determined, the server may only search for a key frame slice file from the slice files preceding the sequence number of the initial slice file. In order to avoid increasing the live streaming delay, the key frame slice file must be closest to the sequence number of the initial slice file, thus, ensuring that the number of audio-video frames between the key frame and the initial slice file are kept to the minimum. In other words, the sequence number of the key frame slice file may be smaller than or equal to the sequence number of the initial slice file. At the same time, the difference between the sequence number of the key frame slice file and the sequence number of the initial slice file may be kept to the minimum. Through the key frame information which includes the sequence number of the key frame slice file, the server may calculate the sequence number difference to obtain the sequence number of the key frame slice file.

Step S1042: when the sequence number of the key frame slice file is smaller than the sequence number of the initial slice file, transmitting the start-streaming response file and the initial slice file sequence number by the server to the player client, where the start-streaming response file includes the key frame slice file, intermediate slice files having the sequence numbers between the sequence number of the key frame slice and the sequence number of the initial slice file, and the initial slice file.

Specifically, when the initial slice file does not contain a key frame, the server may transmit the key frame slice file and the subsequent slice files to the player client. At this point, the start-streaming response file may include the key frame slice file, the intermediate slice file having the sequence number between the sequence number of the key frame slice and the sequence number of the initial slice file, and the initial slice file.

Step S1043: when the sequence number of the key frame slice file is equal to the sequence number of the initial slice file, transmitting the start-streaming response file and the initial slice file sequence number by the server to the player client, where the start-streaming response file includes the initial slice file, and the initial slice file is the key frame slice file.

Specifically, in terms of the initial slice file containing a key frame, in this case, the initial slice file may be a key frame slice file. The server may transmit the initial slice file and the subsequent slice files to the player client.

Step S105: resetting, by the player client, timestamps for the start-streaming response file based on a key frame closest to the initial slice file, and decoding and playing the start-streaming response file with the timestamps reset.

In the embodiment, this step may have two scenarios.

In the scenario where the sequence number of the key frame slice file is smaller than the sequence number of the initial slice file, resetting the timestamp for the start-streaming response file at the player client may include the following steps.

The player client may discard the audio-video frames preceding the key frame in the key frame slice file, and may reset the timestamp of the key frame and the audio-video frames succeeding the key frame in the key frame slice file to the initial timestamp. Specifically, because the audio-video frames preceding the key frame are useless to the live streaming, the audio-video frames preceding the key frame may be discarded. At the same time, because the player client may start the live streaming once the key frame is obtained, the audio-video frames succeeding the key frame may be useless too. Resetting the timestamp of the useless audio-video frames to the initial timestamp may allow rapid skipping of the useless audio-video frames, and the player client may rapidly play the first image frame on the display screen.

The player client may reset the timestamps for the audio-video frames in the intermediate slice file. Specifically, the player client may start live streaming from the position of the initial slice. Thus, the intermediate slice file may be useless, and may be rapidly skipped similarly by resetting the timestamp to the initial timestamp.

The timestamp of the first frame of the initial slice file may be set as the reference value. The player client may reset the timestamp for each frame in the initial slice file and subsequent slice files to an adjusted timestamp. The adjusted timestamp may be the original timestamp of the corresponding audio-video frame minus the reference value and plus the initial timestamp. Specifically, the player client may perform the live streaming based on the key frame and the initial slice file. To ensure the normal operation of the live streaming, the timestamps of the initial slice file may be reset. That is, the original timestamp for each audio-video frame in the initial slice file minus the original timestamp of the first frame in the initial slice file and plus the initial timestamp may be the reset timestamp for each frame in the initial slice file. For example, the initial timestamp may be 00:00:10. The original timestamp for the first frame in the initial slice file may be 10:05:50. The original timestamp for the $50^{th}$ frame in the initial slice file may be 10:05:52. Then, the adjusted timestamp for the $50^{th}$ frame may be 10:05:52 minus 10:05:50 and plus 00:00:10, that is, 00:00:12.

For the case where the sequence number of the key frame slice file is equal to the sequence number of the initial slice file, resetting the timestamp for the start-streaming response file at the player client may include the following steps.

The player client may discard the audio-video frames preceding the key frame in the key frame slice file, and may reset the timestamp of the key frame to the initial timestamp.

The original timestamp of the key frame may be set as the reference value. The player client may reset the timestamp for each frame succeeding the key frame to an adjusted timestamp. The adjusted timestamp may be the original timestamp of the corresponding audio-video frame minus the reference value and plus the initial timestamp.

Specifically, when the sequence number of the key frame slice file is equal to the sequence number of the initial slice file, the player client may similarly discard the audio-video frames preceding the key frame in the initial slice file, and may reset the timestamp of the key frame and all audio-video frames succeeding the key frame.

It should be noted that the server may reset the timestamps of the start-streaming response file and the succeeding slice files. Similarly, the timestamp resetting may be divided into the two scenarios where the sequence number of the key frame slice file is smaller than or equal to the sequence number of the initial slice file, and the resetting content may be similar to the resetting content at the player client. After the timestamp resetting is completed at the server, the server may transmit the start-streaming response file and the succeeding slice files that have been reset to the player client. The player client may play the received files according to normal live streaming operation.

In the embodiment, when a physical slicing method is used, the player client may request the slice files succeeding the start-streaming response file from the server according to the ascending order of the physical slice sequence numbers.

In the embodiment, when a logical slicing method is used, the server may continue to automatically transmit the logical slices succeeding the start-streaming response file in the ascending order.

Specifically, the slice files succeeding the start-streaming response file may need the similar resetting of the timestamps to the adjusted timestamps. After the timestamp resetting is completed, the player client may decode and play the slice files according to the ascending order of the sequence numbers.

Embodiment 2

Figure 3:
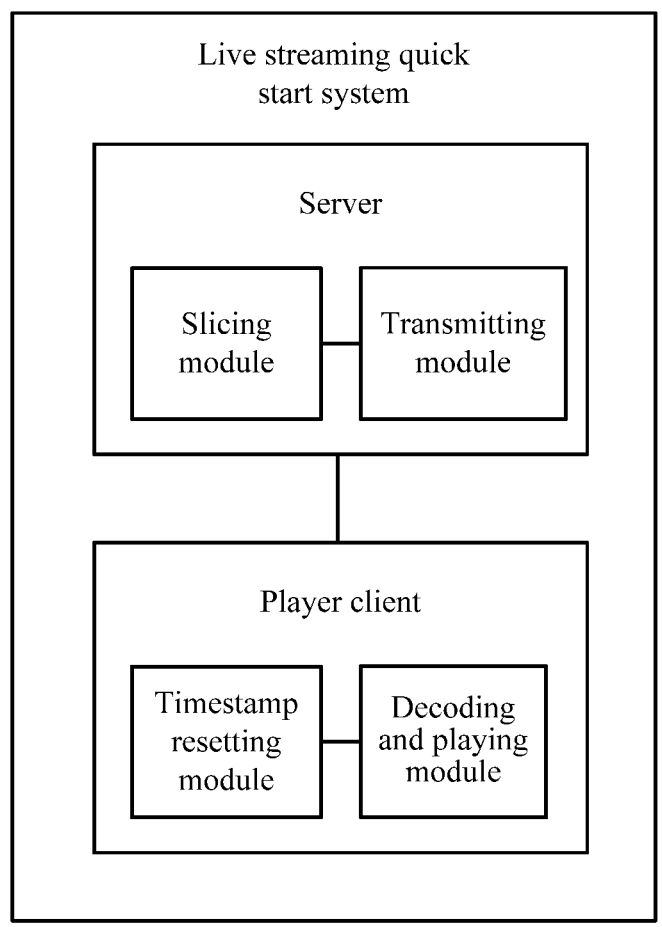
FIG. 3 illustrates a schematic diagram of an exemplary live streaming quick start system according to Embodiment 2 of the present disclosure.

Referring to FIG. 3, the embodiment of the present disclosure provides a live streaming quick start system for executing the live streaming quick start method provided by Embodiment 1. The system may include a server and a player client. The server may include a slicing module and a transmitting module. The player client may include a timestamp resetting module and a decoding and playing module.

The slicing module may be used to slice the audio-video stream, and may assign sequence numbers to the generated slice files according to the timestamps in the audio-video stream. Further, the slicing module may be used to record the key frame information of the audio-video stream, and may determine the sequence number of the initial slice file according to the live streaming request sent by the player client.

The transmitting module may be used to transmit the start-streaming response file and the sequence number of the initial slice file to the player client according to the sequence number of the initial slice and the recorded key frame information of the audio-video stream.

The timestamp resetting module may be used to reset the timestamps of the start-streaming response file based on the key frame closest to the initial slice file sequence number.

The decoding and playing module may be used to decode and play the start-streaming response file that has the timestamps reset.

In the embodiment, the transmitting module may be used to perform the followings.

The transmitting module may determine a key frame slice file that has a sequence number closest to the initial slice file sequence number. The key frame slice file may be a slice file that contains a key frame and has a sequence number smaller than or equal to the sequence number of the initial slice file. At the same time, the difference between the sequence number of the key frame slice file and the sequence number of the initial slice file may be the minimum.

When the sequence number of the key frame slice file is smaller than the sequence number of the initial slice file, the transmitting module may transmit the start-streaming response file and the initial slice file sequence number to the player client, where the start-streaming response file includes the key frame slice file, an intermediate slice file having the sequence number between the sequence number of the key frame slice and the sequence number of the initial slice file, and the initial slice file.

When the sequence number of the key frame slice file is equal to the sequence number of the initial slice file, the transmitting module may transmit the start-streaming response file and the initial slice file sequence number to the player client, where the start-streaming response file includes the initial slice file, and the initial slice file is the key frame slice file.

In the embodiment, when the sequence number of the key frame slice file is smaller than the sequence number of the initial slice file, the timestamp resetting module may perform the followings.

The timestamp resetting module may discard the audio-video frames preceding the key frame in the key frame slice file, and may reset the timestamp of the key frame and the audio-video frames succeeding the key frame to the initial timestamp.

The timestamp resetting module may reset the timestamp for the audio-video frames in the intermediate slice file to the initial timestamp.

The original timestamp of the first frame of the initial slice file may be set as the reference value. The timestamp resetting module may reset the timestamp for each frame in the initial slice file and subsequent slice files to an adjusted timestamp. The adjusted timestamp may be the original timestamp of the corresponding audio-video frame minus the reference value and plus the initial timestamp.

In the embodiment, when the sequence number of the key frame slice file is equal to the sequence number of the initial slice file, the timestamp resetting module may perform the followings.

The timestamp resetting module may discard the audio-video frames preceding the key frame in the key frame slice file, and may reset the timestamp of the key frame to the initial timestamp.

The original timestamp of the first frame of the initial slice file may be set as the reference value. The timestamp resetting module may reset the timestamp for each frame succeeding the key frame to an adjusted timestamp. The adjusted timestamp may be the original timestamp of the corresponding audio-video frame minus the reference value and plus the initial timestamp.

In the embodiment, the slicing module may be used to generate a key frame slice file sequence number list according to the slice files of the audio-video stream and the corresponding sequence numbers.

In the embodiment, when the slices are physically sliced, the slicing module may perform the followings.

The slicing module may slice the audio-video stream into slices according to a preset time interval and generate slice files accordingly.

The slicing module may assign natural numbers as the sequence numbers of the generated slice files according to the timestamps.

Figure 4:
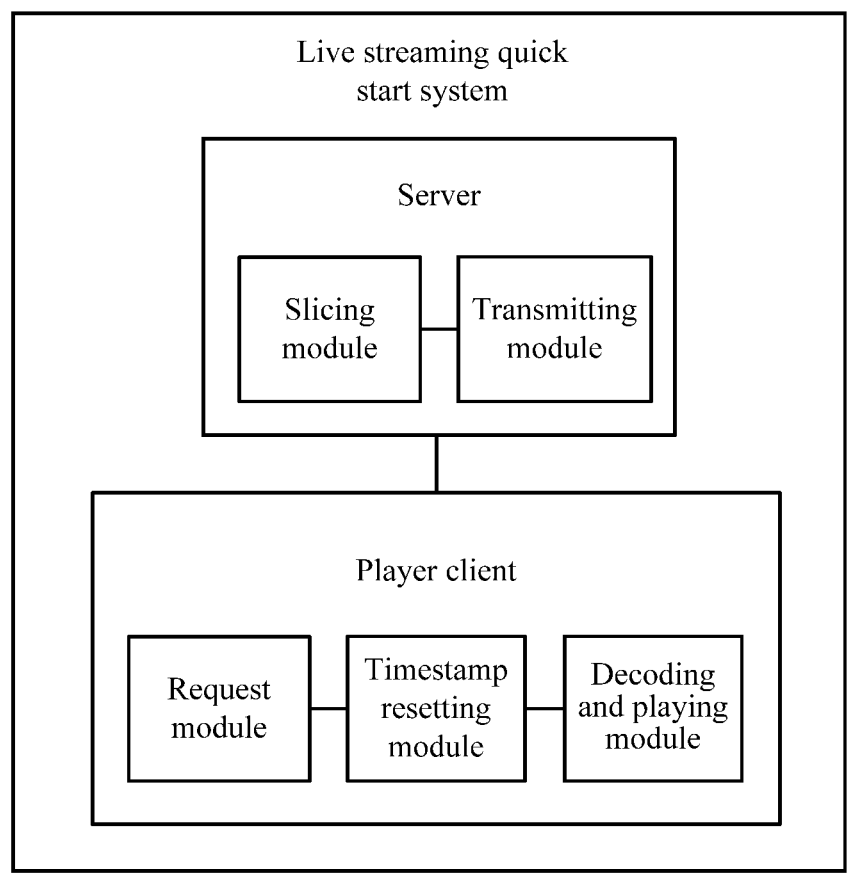
FIG. 4 illustrates a schematic diagram of another exemplary live streaming quick start system according to Embodiment 2 of the present disclosure.

Referring to FIG. 4, in the embodiment, the player client may also include a request module, configured to continue to request the slice files succeeding the start-streaming response file from the server in the ascending order of the sequence numbers of the physical slices.

In the embodiment, when the slices are logically sliced, the slicing module may perform the followings.

The slicing module may insert a header byte containing a slice sequence number into the audio-video stream file according to a preset time interval. The slice sequence numbers may be natural numbers assigned according to the timestamps.

In the embodiment, the transmitting module may also be used to continue to automatically transmit the logical slices succeeding the start-streaming response file in the ascending order.

In the embodiment, the live streaming request sent by the player client may include a delay parameter.

The transmitting module may also be used to calculate a sequence number for the initial slice file according to the delay parameter in the live streaming request and the sequence number of the latest slice of the audio-video stream.

In the embodiment, the timestamps of the start-streaming response file may be reset according to the sequence number of the key frame closest to the initial slice file. The key frame closest to the initial slice and the initial slice file may be combined to achieve the quick start effect. At the same time, the timestamps for all the audio-video frames between the key frame and the initial slice file may be reset to the initial timestamp, and may be rapidly skipped. Thus, the effect of not affecting the live streaming delay may be achieved.

The sequence of the embodiments of the present disclosure are intended to be descriptive, and do not represent any preference.

The system embodiments described above are merely for illustrative purpose. The units described as separated parts may or may not be physically detached. The parts displayed as units may or may not be physical units, i.e., may be located at one place, or distributed at a plurality of network units. Based on the actual needs, a part or all of the modules may be selected to achieve the objective of the embodiments. Those ordinarily skilled in the art may understand and implement the disclosed embodiments without contributing creative labor.

Through the descriptions of various aforementioned embodiments, those skilled in the art may clearly understand that the embodiments may be implemented by means of software in conjunction with an essential common hardware platform, or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, etc., and may include a plurality of instructions to enable a computer device (may be a personal computer, a server, or a network device) having one or more processors to execute the methods described in various embodiments or parts of the embodiments.

The foregoing are merely certain preferred embodiments of the present disclosure, and are not intended to limit the present disclosure. Without departing from the spirit and principles of the present disclosure, any modifications, equivalent substitutions, and improvements, etc. shall fall within the scope of the present disclosure.

What is claimed is:

1. A live streaming quick start method, comprising:
    slicing, by a server, an audio-video stream into slice files, and assigning a sequence number to each generated slice file according to timestamps of the audio-video stream;
    recording, by the server, key frame information of the audio-video stream;
    determining, by the server, an initial slice file sequence number in response to a live streaming request sent by a player client;
    based on the initial slice file sequence number and the recorded audio-video stream key frame information, transmitting, by the server, a start-streaming response file and the initial slice file sequence number to the player client; and
    resetting, by the player client, timestamps for the start-streaming response file based on a key frame closest to the initial slice file sequence number, and decoding and playing the start-streaming response file according to the reset timestamps, wherein resetting, by the player client, the timestamps for the start-streaming response file based on the key frame closest to the initial slice file sequence number further includes:
resetting, by the player client, timestamps for all audio-video frames including and between the key frame and a first frame in the initial slice file to be an initial timestamp for starting a live streaming in response to the live streaming request, wherein audio-video frames in between the key frame and the first frame in the initial slice file are skipped during the live streaming.

2. The live streaming quick start method according to claim 1, wherein based on the initial slice file sequence number and the recorded audio-video stream key frame information, transmitting, by the server, the start-streaming response file and the initial slice file sequence number to the player client includes:
determining, by the server, a key frame slice file that has a sequence number closest to the initial slice file sequence number, wherein the key frame slice file is a slice file that contains a key frame and has a sequence number smaller than or equal to the initial slice file sequence number, and at the same time, a difference between the sequence number of the key frame slice file and the initial slice file sequence number is the minimum;
when the sequence number of the key frame slice file is smaller than the initial slice file sequence number, transmitting the start-streaming response file and the initial slice file sequence number by the server to the player client, wherein the start-streaming response file includes the key frame slice file, intermediate slice files having sequence numbers between the sequence number of the key frame slice and the initial slice file sequence number, and the initial slice file; and
when the sequence number of the key frame slice file is equal to the initial slice file sequence number, transmitting the start-streaming response file and the initial slice file sequence number by the server to the player client, wherein the start-streaming response file includes the initial slice file, and the initial slice file is the key frame slice file.

3. The live streaming quick start method according to claim 2, wherein when the sequence number of the key frame slice file is smaller than the initial slice file sequence number, resetting, by the player client, the timestamps for the start-streaming response file includes:
discarding, by the player client, audio-video frames preceding the key frame in the key frame slice file, and resetting a timestamp of the key frame to be the initial timestamp;
resetting, by the player client, timestamps for audio-video frames in the intermediate slice files to be the initial timestamp; and
assuming an original timestamp for the first frame in the initial slice file is a reference value, resetting, by the player client, a timestamp for each frame in the initial slice file and each succeeding slice file to an adjusted timestamp, wherein the adjusted timestamp is an original timestamp for the corresponding audio-video frame minus the reference value and plus the initial timestamp.

4. The live streaming quick start method according to claim 2, wherein when the sequence number of the key frame slice file is equal to the initial slice file sequence number, resetting, by the player client, the timestamps for the start-streaming response file includes:
discarding, by the player client, audio-video frames preceding the key frame in the key frame slice file, and resetting a timestamp for the key frame to be the initial timestamp; and
assuming an original timestamp for the key frame is a reference value, resetting, by the player client, a timestamp for each audio-video frame succeeding the key frame to be an adjusted timestamp, wherein the adjusted timestamp is an original timestamp for the corresponding audio-video frame minus the reference value and plus the initial timestamp.

5. The live streaming quick start method according to claim 4, wherein the slicing is physical slicing, and slicing, by the server, an audio-video stream into slices, and assigning a sequence number to each generated slice file according to timestamps of the audio-video stream further includes:
slicing, by the server, the audio-video stream according to a preset time interval to generate slice files; and
assigning, by the server, natural numbers as the sequence numbers of the generated slice files according to the timestamps.

6. The live streaming quick start method according to claim 5, wherein resetting, by the player client, the timestamps for the start-streaming response file further includes:
after receiving, by the player client, the start-streaming response file and resetting the timestamps,
continuing to request for slice files succeeding the start-streaming response file from the server in an ascending order of physical slice sequence numbers, resetting timestamps for the slice files succeeding the start-streaming response file, and decoding for playing.

7. The live streaming quick start method according to claim 4, wherein the slicing is logical slicing, and slicing, by the server, an audio-video stream into slices, and assigning a sequence number to each generated slice file according to timestamps of the audio-video stream, further includes:
inserting, by the server, a header byte including a slice sequence number in an audio-video stream file according to a preset time interval; and
assigning, by the server, natural numbers as the sequence numbers of the generated slice files according to the timestamps.

8. The live streaming quick start method according to claim 7, wherein resetting, by the player client, the timestamps for the start-streaming response file further includes:
after receiving, by the player client, the start-streaming response file and resetting the timestamps,
continuing, by the server, to automatically transmit logic slices succeeding the start-streaming response file in an ascending order of slice file sequence numbers; and
resetting, by the player client, timestamps for the logic slices succeeding the start-streaming response file, and decoding for playing.

9. The live streaming quick start method according to claim 1, wherein recording, by the server, key frame information in the audio-video stream includes:
based on the audio-video stream slice files and the corresponding sequence numbers, generating, by the server, a numbered list of key frame slice files.

10. The live streaming quick start method according to claim 1, wherein:
the live streaming request sent by the player client includes a delay parameter; and determining, by the server, an initial slice file sequence number in response to the live streaming request sent by the player client further includes:
calculating, by the server, the initial slice file sequence number based on the delay parameter in the live streaming request and the latest slice sequence number of the audio-video stream.

11. A live streaming quick start system, comprising:
a server including one or more processors; and
a player client including one or more processors, wherein
the one or more processors in the server are configured to:
slice an audio-video stream into slice files, assign a sequence number to each generated slice file according to timestamps of the audio-video stream, record key frame information of the audio-video stream, determine an initial slice file sequence number in response to a live streaming request sent by the player client; and
transmit a start-streaming response file and the initial slice file sequence number to the player client based on the initial slice file sequence number and the recorded audio-video stream key frame information; and
the one or more processors in the player client are configured to:
reset timestamps for the start-streaming response file based on a key frame closest to the initial slice file sequence number by resetting timestamps for all audio-video frames including and between the key frame and a first frame in the initial slice file to be an initial timestamp for starting a live streaming in response to the live streaming request, wherein audio-video frames in between the key frame and the first frame in the initial slice file are skipped during the live streaming; and
decode and play the start-streaming response file according to the reset timestamps.

12. The live streaming quick start system according to claim 11, wherein the one or more processors in the server are further configured to:
determine a key frame slice file that has a sequence number closest to the initial slice file sequence number, wherein the key frame slice file is a slice file that contains a key frame and has a sequence number smaller than or equal to the sequence number of the initial slice file, and at the same time, a difference between the sequence number of the key frame slice file and the sequence number of the initial slice file is the minimum;
when the sequence number of the key frame slice file is smaller than the initial slice file sequence number, transmit the start-streaming response file and the initial slice file sequence number to the player client, wherein the start-streaming response file includes the key frame slice file, intermediate slice files having the sequence numbers between the sequence number of the key frame slice and the initial slice file sequence number, and the initial slice file; and
when the sequence number of the key frame slice file is equal to the initial slice file sequence number, transmit the start-streaming response file and the initial slice file sequence number to the player client, wherein the start-streaming response file includes the initial slice file, and the initial slice file is the key frame slice file.

13. The live streaming quick start system according to claim 12, wherein when the sequence number of the key frame slice file is smaller than the initial slice file sequence number, the one or more processors in the player client are further configured to:
discard audio-video frames preceding the key frame in the key frame slice file and reset a timestamp of the key frame to be the initial timestamp;
reset timestamps for audio-video frames in the intermediate slice files to be the initial timestamp; and
assuming an original timestamp for the first frame in the initial slice file is a reference value, reset a timestamp for each frame in the initial slice file and each succeeding slice file to an adjusted timestamp, wherein the adjusted timestamp is an original timestamp for the corresponding audio-video frame minus the reference value and plus the initial timestamp.

14. The live streaming quick start system according to claim 12, wherein when the sequence number of the key frame slice file is equal to the initial slice file sequence number, the one or more processors in the player client are further configured to:
discard audio-video frames preceding the key frame in the key frame slice file, and reset a timestamp for the key frame to be the initial timestamp; and
assuming an original timestamp for the first frame in the initial slice file is a reference value, reset a timestamp for every audio-video frame succeeding the key frame to be an adjusted timestamp, wherein the adjusted timestamp is an original timestamp for the corresponding audio-video frame minus the reference value and plus the initial timestamp.

15. The live streaming quick start system according to claim 11, wherein:
the one or more processors in the server are further configured to generate a list of key frame slice file sequence numbers based on the audio-video stream slice files and the corresponding sequence numbers.

16. The live streaming quick start system according to claim 11, wherein when the slices are physically sliced, the one or more processors in the server are further configured to:
slice the audio-video stream according to a preset time interval and generate slice files accordingly; and
assign natural numbers as the sequence numbers of the generated slice files according to the timestamps.

17. The live streaming quick start system according to claim 16, wherein the one or more processors in the player client are further configured to continue to request for slice files succeeding the start-streaming response file from the server in an ascending order of physical slice sequence numbers.

18. The live streaming quick start system according to claim 11, wherein when the slices are logically sliced, the one or more processors in the server are further configured to:
insert a header byte including a slice sequence number in an audio-video stream file according to a preset time interval; and
assign natural numbers as the sequence numbers of the generated slice files according to the timestamps.

19. The live streaming quick start system according to claim 18, wherein one or more processors in the server are further configured to continue to automatically transmit logic slices succeeding the start-streaming response file in an ascending order of slice sequence numbers.

20. The live streaming quick start system according to claim 11, wherein:

the live streaming request sent by the player client includes a delay parameter; and the one or more processors in the server are further configured to calculate the initial slice file sequence number based on the delay parameter in the live streaming request and the latest slice sequence number of the audio-video stream.

* * * * *